Aug. 16, 1927.

F. SATTERSTROM

SIGNALING MEANS

Filed April 23, 1924　　2 Sheets-Sheet 1

1,639,112

INVENTOR
FERDINAND SATTERSTROM
By Paul, Paul & Moore
ATTORNEYS

Aug. 16, 1927.

F. SATTERSTROM 1,639,112

SIGNALING MEANS

Filed April 23, 1924   2 Sheets-Sheet 2

INVENTOR
FERDINAND SATTERSTROM
By Paul, Paul & Moore
ATTORNEYS

Patented Aug. 16, 1927.

1,639,112

UNITED STATES PATENT OFFICE.

FERDINAND SATTERSTROM, OF HASTINGS, MINNESOTA.

SIGNALING MEANS.

Application filed April 23, 1924. Serial No. 708,470.

This invention relates to improvements in signaling means adapted more particularly for use with motor vehicles. The particular function of the embodiment of the invention here shown is to indicate the intent of the driver of the vehicle to make a turn to the left of the direction traveled although obviously other signal indicia may be borne by the device. Broadly, the device is one which is adapted to assume an invisible position when inoperative and which may be moved to a completely visible signaling position. The novel structure is such that the whole apparatus may occupy a relatively small inconspicuous position upon a motor vehicle. Such advantage is achieved by providing a collapsible signal which may be moved to a compact collapsed position when inoperative and selectively moved to an extended conspicuous signaling position. Another and more specific feature resides in the means for locking the signal members in each of the two positions to prevent accidental release.

The object therefore of the invention is to provide an improved signaling means.

Other objects of the invention will more fully appear from the following description and the accompanying drawings and will be pointed out in the annexed claims.

In the drawings there has been disclosed a structure designed to carry out the objects of the invention but it is to be understood that this invention is not confined to the exact features shown as various changes may be made within the scope of the claims which follow.

The selected embodiment of the invention here shown for purposes of disclosure includes a signal-bearing device of a fan-like principle. Preferably, the leaves are separate units with a common pivotal mounting and are adapted to be moved into a collapsed substantially nested inoperative position and to an extended position whereby the signal is clearly indicated whether by means merely of the conspicuous extended position or by the addition of signal indicia displayed by the extended leaves.

Figures 6, 7:
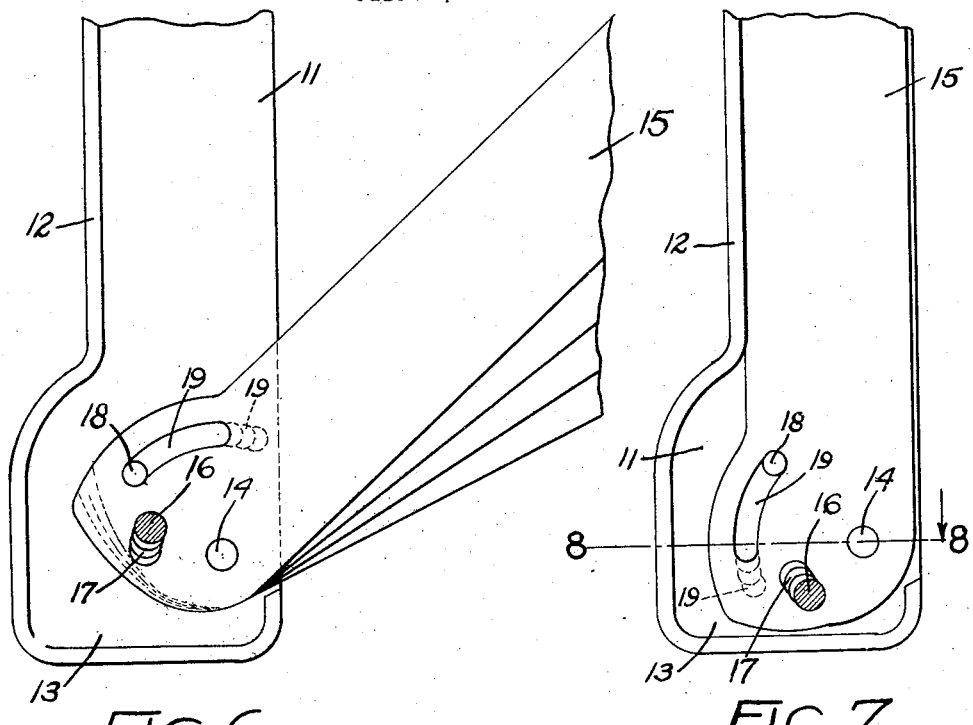
Figure 6 is a view in elevation of a portion of the signal-bearing members and their pivotal mounting.
Figure 7 is a view similar to that of Figure 6, but showing the members swung to inoperative collapsed position.

A supporting casing or housing is provided by the metallic elongated strip 11 preferably formed with a marginal flange 12 along three sides. An enlarged base 13 is provided adjacent the lower end of the strip. A pivot 14 is carried by the base and inwardly projects to pass through alined apertures in each of the signal leaves 15 which are here shown as four in number although obviously a larger or smaller number may be employed as desired. These leaves are assembled in a relatively superposed position upon the pivot 14 and may be moved by means of the pin 16 which is carried upon the lowermost leaf. Each of the superposed leaves is formed with a slot 17 through which this actuating pin 16 extends. As is shown in Figure 7, each slot of each superposed leaf is slightly longer than the slot in the adjacent leaf beneath. When the leaves are in their inoperative nested superposed position, the actuating pin 16 rests against the lower end of each of the leaf-slots 17, as is indicated in Figure 7. However, when the actuating pin 16 is moved, by means hereinafter described, it engages the upper edge of each slot 17 and, as each succeeding superposed slot is longer than the adjacent lower, the pin 16 moves the superposed leaves through progressively shorter arcs to operative signal-displaying position as is indicated in Figure 6. Return movement of the actuating pin 16 likewise acts to restore the leaves to normal inoperative position as is shown in Figure 7.

Means are provided to limit the pivotal travel of the leaves. This means comprises a detent or stud 18 inwardly projecting from the base 13 in spaced relation to the pivot 14. This stud is adapted to extend through arcuate slots 19, one being formed in each of the leaves. These limiting slots 19 are in alinement but are of different lengths. Unlike the slots 17, the longest slot 19 is in the lowermost leaf and the slots progressively decrease in length as is suggested by the dotted lines in Figures 6 and 7. When the device is in its inoperative position shown in Figure 7, the stud 18 abuts against the upper or outer ends of each slot thus limiting the inward travel of each leaf. Upon outward travel of each leaf toward signaling position, the leaves are progressively stopped as is indicated in Figure 6.

Figure 1:
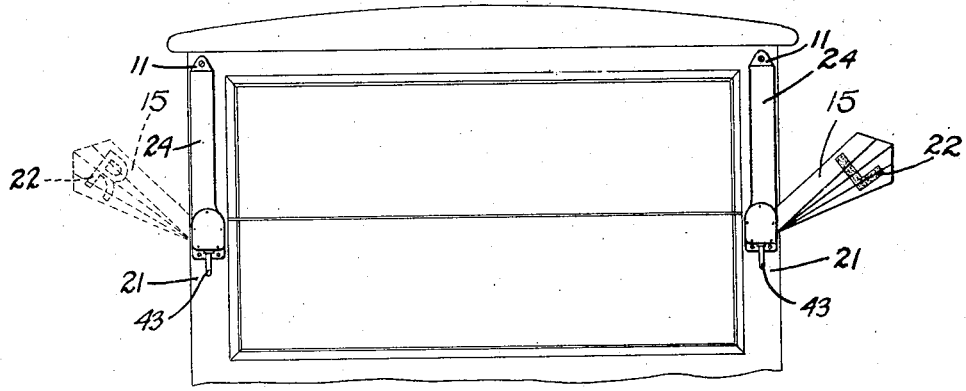
Figure 1 is a view in front elevation of a portion of the wind-shield of a motor vehicle with a pair of the signaling means secured thereto.

As is shown in Figure 1, the leaves may be mounted upon the forward side of the windshield frame 21 of an automobile and the leaves may complementarily bear signal indicia 22, such as the letter "L", to indicate an intent to turn to the left. A similar signaling means may be used upon the opposite side of the frame as shown in full lines in Figure 1, in which is also suggested, in dotted lines, the operative position of this second signal upon the leaves of which may be employed the letter "R" to indicate an intent to turn to the right.

Figures 5, 8:
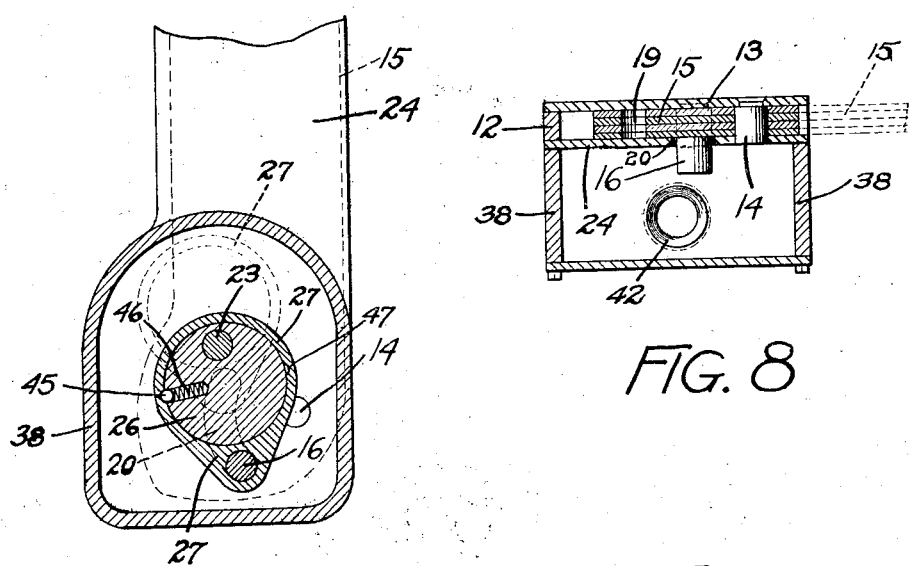
Figure 5 is a vertical section on the line 5—5 of Figure 2.
Figure 8 is a cross-sectional view on the line 8—8 of Figure 7, with the housing added in cross-section.

As above stated, the movement of the leaves is determined by movement of the actuating pin 16. In this embodiment of the invention there is shown a mechanism for conveniently operating this actuating pin such, for example, as by means of a chain which may be extended within convenient reach of the driver of the vehicle for manual operation or may be connected to a pedal for foot operation. Broadly, this operating mechanism consists of a wheel or pulley adapted to be rotated to move an eccentric which is connected to the actuating pin 16 for imparting thereto a movement in the desired direction. A post 23 is fixedly carried by the cover plate 24 of the elongated strip 11. The plate 24 has an arcuate clearance-slot 20 through which the pin 16 projects and along which it may travel. A disc 25 is rotatably borne by the post adjacent the plate 24. The inner portion of the disc is built up to provide an eccentric 26 which is peripherally fitted with a strap pitman 27. This eccentric bears an enlarged portion which is apertured to receive the actuating pin 16 as is shown in Figure 5. Hence, any rotative movement of the disc 25 upon its bearing post 23 will cause the eccentric 26 to move the pitman 27 and hence the actuating pin 16 and thus in turn to move the leaves from one position to another. These parts are so constructed and arranged that a half-revolution of the disc 25 will move the crank 27 from the full line position in Figure 5 (which corresponds to the leaf positions in Figure 7) to its dotted line position also shown in Figure 5. This dotted line position of the pitman 27 corresponds to the leaf positions shown in Figure 6.

A convenient means for successively effecting half-revolutions of the disc is afforded by means of a pulley 28 actuable by a flexible member such as a chain 29 in combination with a suitable detent to limit the travel of the pulley and with a pawl and ratchet connection to the disc.

Figures 2, 3, 4:
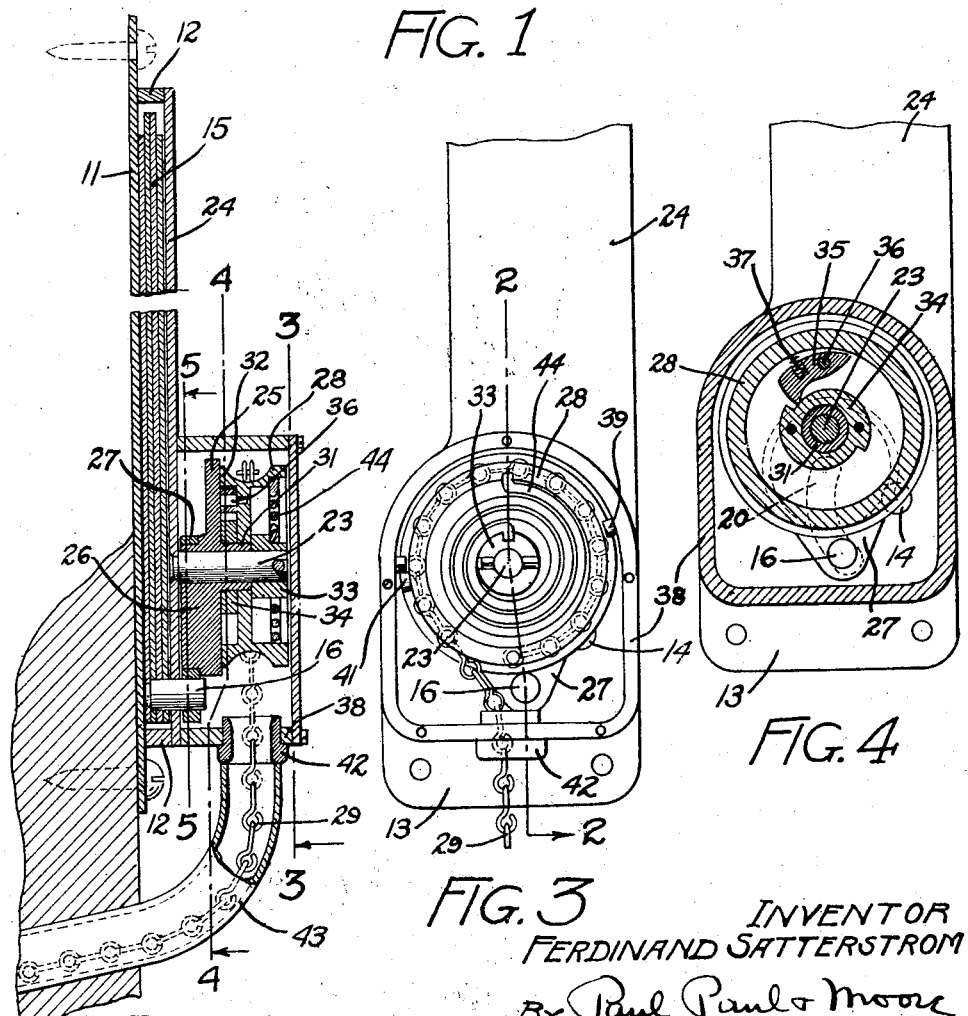
Figure 2 is a vertical section through the signaling means and support.
Figure 3 is a vertical section on the line 3—3 of Figure 2.
Figure 4 is a vertical section on the line 4—4 of Figure 2.

The disc is provided with an annular shoulder 31 upon the periphery of which is rotatably borne the central web of the pulley 28. The inner peripheral flange 32 of the pulley slidably abuts against the outer face of the disc. A collar 33 is terminally fitted about the end of the post 23 and is pinned thereto, the inner face of the collar abutting against the outer face of the central portion of the pulley web so that the pulley is held in closely assembled relation to the disc. A ratchet 34 is pinned to the disc and is thereby adapted to move therewith. A pawl 35 is pivotally mounted upon the pin 36 carried by the web of the pulley 28 and has a tension spring 37 coacting with the radially inward face of the pulley flange 32 in order that the pawl may be constantly pressed toward the ratchet 34. Rotation of the pulley causes similar movement of the pawl to engage one of the diametrically opposite teeth of the ratchet and thereby to cause the ratchet and disc to turn with the pulley. The rotation of the pulley may be caused by a downward pull upon the chain 29 which is wound about and fastened to the pulley groove. Detents are provided to limit movement of the pulley to substantially 180°. This mechanism is preferably enclosed within a housing 38 secured to the cover plate 24 and a detent 39 inwardly projects from the housing in the path of a detent 41, radially projecting from the pulley periphery. When the parts are in the positions shown in Figures 3 and 4, and the chain 29 is pulled, the pulley may be turned until the detent 41 abuts against the detent 39 whereby the actuating pin 16 is moved and the leaves are changed from the position shown in Figure 7 to the operative signaling position shown in Figure 7. The chain 29 is passed through a guide-sleeve 42 in the base of the pulley housing 38 and is extended through a tubing 43 through the windshield frame to a position adjacent the driver's seat so that the chain may be operably sheathed and terminally provided with a handle or pedal portion. The pulley is provided with tension means for returning it to its normal position shown in Figure 3 after the chain has been pulled. A simple form of such means is provided by a coil spring 44 having one end secured to the pulley and the other to the collar 33 which is pinned to the stationary post 23. In this retractive tensioned movement of the pulley, the pawl 35 travels idly over the ratchet 34.

It is desirable that means be provided to retain the leaves in the selected position both against the ordinary force of gravity as well as against sudden jars and vibrations to which motor vehicles are subject. By reference to Figure 5 it will be noted that the axis of the post 23 is a relatively stationary one and that the axis of the eccentric 26 may travel about the axis of the post. The path of the axis of the pin 16 is one to and from the post 23 as is indicated by the dotted line in Figure 5 which shows the clearance-slot 20. The position of the parts shown in this figure corresponds to the leaf position shown in Figure 7. In such position, the axis of the post 23 of the eccentric 26 and the pin 16 are in alinement or on "dead-center". The pitman 27 is mounted for movement upon the eccentric 26 and hence any vibratory movement imparted to the actuating pin 16 by the leaves would not be opposed. Hence, means are provided to lock the strap pitman 27 to the eccentric when in the position shown in full lines in Figure 5 or when in the dotted line position shown in that figure. This locking mechanism is provided by a ball 45 outwardly thrust by a compression spring 46 seated in a substantially radial recess in the eccentric. Two recesses 47 are formed in the inner face of the strap pitman 27 at opposite points. In Figure 5 the ball is shown as positioned in one of the recesses to prevent relative movement between the pitman 27 and the disc and eccentric 27. This lock prevents movement of the leaves except through torque applied to the disc. Likewise when the leaves are in the signaling position shown in Figure 6, and the eccentric and pitman 27 are in the dotted line position shown in Figure 5, the three centers will again be in alinement and the ball 45 will seat in the other recess 47 and thereby lock the leaves in the selected position.

Having thus described my invention what I claim as new and desire to secure by Letters Patent, is:

1. Signaling means for vehicles including a support adapted to be mounted upon a vehicle, a signal device pivotally mounted upon the support and adapted to assume an inoperative position and an operative signaling position, an element borne by the device to actuate the same, a rotatable operating member, mechanism connecting said rotatable member and actuating element, the centers of said actuating element, rotatable member and mechanism being adapted to be disposed in alinement when the signal device is in either of said two positions, and means to retain said centers in alinement against accidental release, said means being yieldable for normal operation.

2. Signaling means for vehicles including a plurality of leaves having a common pivotal support, said leaves being substantially coincident when in collapsed position, and means adjacent said pivotal support for successively engaging said leaves, and to move them progressively through decreasing angles to an expanded position.

3. Signaling means for vehicles including a plurality of leaves having a common pivotal support adjacent one end, and disconnected at their other ends, said leaves being substantially coincident when in collapsed position, and means adjacent said pivotal support for successively engaging said leaves, to move them progressively through decreasing angles to an expanded position.

4. Signaling means for vehicles including a plurality of leaves having a common pivotal support, said leaves being substantially coincident when in collapsed position, and having a series of concentric, arcuate, registering slots of different lengths, the end walls thereof in the direction in which said leaves move to expanded position, being progressively out of alinement when said leaves are coincident, said leaves being provided with another series of concentric, arcuate slots of progressively different lengths in the same order as the lengths of the slots of the first series, the opposite end walls of said slots being in alinement when the leaves are in expanded position, means movable in the first series of slots and engageable with the said end walls thereof for progressively moving said leaves to expanded position, and means projecting through the second series of slots engageable with the alined end walls thereof for limiting the angular movement of said leaves.

5. Signaling means for vehicles including a plurality of leaves having a common pivotal support, said leaves being substantially coincident when in collapsed position, and having a series of concentric, arcuate, registering slots of different lengths, the end walls thereof in the direction in which said leaves move to expanded position, being progressively out of alinement when said leaves are coincident, said leaves being provided with another series of concentric, arcuate slots of progressively different lengths in the same order as the lengths of the slots of the first series, the opposite end walls of said slots being in alinement when the leaves are in expanded position, a spring returned drum, means for oscillating said drum in opposition to the pull of said spring, a crank carried by said drum, a pin on said crank movable in the first series of slots and engageable with the said end walls thereof for progressively moving said leaves to expanded position, and means projecting through the second series of slots and engageable with the alined end walls thereof for limiting the angular movement of said leaves.

In witness whereof, I have hereunto set my hand this 11th day of April, 1924.

FERDINAND SATTERSTROM.